United States Patent
Lee et al.

(10) Patent No.: US 9,405,685 B2
(45) Date of Patent: Aug. 2, 2016

(54) METHOD OF PROVIDING CONTENT DURING HAND-OVER AND APPARATUS THEREFOR

(71) Applicant: SK Telecom Co., Ltd., Seoul (KR)

(72) Inventors: Jong Min Lee, Seongnam-si (KR);
Kyung Jun Lee, Seongnam-si (KR);
Young Jae Shim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 514 days.

(21) Appl. No.: 13/873,683

(22) Filed: Apr. 30, 2013

(65) Prior Publication Data
US 2013/0290466 A1    Oct. 31, 2013

(30) Foreign Application Priority Data

Apr. 30, 2012  (KR) .................. 10-2012-0045330

(51) Int. Cl.
| | | |
|---|---|---|
| G06F 15/167 | (2006.01) | |
| G06F 12/08 | (2016.01) | |
| H04L 29/08 | (2006.01) | |
| H04W 36/02 | (2009.01) | |

(52) U.S. Cl.
CPC ............ *G06F 12/0802* (2013.01); *H04L 67/06* (2013.01); *H04L 67/289* (2013.01); *H04L 67/2842* (2013.01); *H04W 36/02* (2013.01)

(58) Field of Classification Search
CPC ... H04L 67/2842; H04L 29/08; H04W 36/02; G06F 15/167; G06F 12/08; G06F 12/0802
USPC ......................................... 709/213; 370/331
See application file for complete search history.

(56) References Cited

U.S. PATENT DOCUMENTS

| | | | | |
|---|---|---|---|---|
| 2011/0280216 | A1* | 11/2011 | Li ........................... | H04L 12/14 370/331 |
| 2012/0082131 | A1 | 4/2012 | Agrawal et al. | |
| 2012/0218970 | A1* | 8/2012 | Westberg ................ | H04L 67/28 370/331 |
| 2014/0245359 | A1* | 8/2014 | De Foy .............. | H04N 21/6181 725/62 |

FOREIGN PATENT DOCUMENTS

| | | |
|---|---|---|
| JP | 2012023659 A | 2/2012 |
| KR | 101070982 B1 | 10/2011 |
| WO | 2011032732 A1 | 3/2011 |

OTHER PUBLICATIONS

Korean Office Action dated Mar. 8, 2016 corresponding to Application No. 10-2012-0045330.
Chinese Office Action mailed Nov. 11, 2015 for corresponding Chinese application No. 201310157870.5.

* cited by examiner

*Primary Examiner* — Frantz Jean
(74) *Attorney, Agent, or Firm* — Hauptman Ham, LLP

(57) ABSTRACT

The present invention relates to a method and apparatus for providing mobile content to seamlessly transmit content to a mobile node even during a hand-over of the mobile node through local caching devices distributed in a mobile network. When a specific local caching device detects a hand-over of the mobile node, content data transmitted from the specific local caching device is delivered to the mobile node through a mobile CDN controller, or blocking of content from a origin server is revoked to deliver content data from the origin server to the handed-over mobile node.

18 Claims, 9 Drawing Sheets

METHOD OF PROVIDING CONTENT DURING HAND-OVER AND APPARATUS THEREFOR

CROSS REFERENCE TO RELATED APPLICATION

This application claims the priority of Korean Patent Application No. 10-2012-0045330, filed on Apr. 30, 2012 in the Korean Intellectual Property Office (KIPO), the disclosure of which is incorporated herein in their entirety by reference.

BACKGROUND OF THE INVENTION

1. Field of the Invention

The present invention relates to a mobile content providing method and apparatus for providing content to a mobile node connected to a mobile network, and more particularly, to a mobile content providing method and apparatus capable of seamlessly delivering content even during a hand-over of a mobile node.

2. Description of the Related Art

A content delivery network (CDN) service stably delivers various types of content including movies, music video, etc. to users. The CDN service is implemented in such a manner that content is stored in a plurality of cache servers distributed in a network in advance, a most suitable cache server is selected from the plurality of cache servers through a load balancer such as a GLB (Global Load Balance) server, and requested content is delivered to a user terminal through the selected cache server.

The CDN service overcomes instability such as data loss, bottleneck, transmission rate decrease, disconnected data transmission, etc.

As performances and functions of mobile terminals such as smartphones are improved and communication cost decreases, use of content through the mobile terminals sharply increases, and thus an attempt to combine a CDN origin server with a mobile network is made.

However, the mobile network is designed in consideration of mobility of users and hand-over frequently occurs as the users move. Accordingly, a method for seamlessly providing content even during a hand-over is needed.

SUMMARY OF THE INVENTION

An object of the present invention is to provide a method for providing mobile content during a hand-over, which can seamlessly deliver content even during a hand-over of a mobile node when providing content to the mobile node using local caching devices distributed in a mobile network, and an apparatus for the mobile content providing method.

The object of the present invention can be achieved by providing a mobile CDN controller, including: a communication interface for communicating with a plurality of local caching devices distributed in a mobile network and a packet core of the mobile network; and a content transmission controller for receiving, from a specific local caching device from among the plurality of local caching devices, a signal representing a hand-over of a mobile node to which the specific local caching device currently transmits content data, determining a selected one of local caching devices capable of transmitting the content data to the mobile node, and controlling the content data stored in one of the specific local caching device, the selected local caching device and a origin server to be transmitted to the mobile node according to whether the selected local caching device stores the content data.

The content transmission controller may provide flow information necessary to transmit the content data to the mobile node to the selected local caching device such that the selected local caching device transmits the content data to the mobile node with reference to the flow information when the selected local caching device stores the content data.

The content transmission controller may receive the content data from the specific local caching device and transmit the content data to the packet core of the mobile network such that the content data is delivered to the mobile node when the selected local caching device does not store the content data.

The content transmission controller may revoke blocking of content received from the origin server such that content data of the origin server is delivered to the mobile node through the packet core of the mobile network when the selected local caching device does not store the content data.

When a hand-over of the mobile node is detected, the content transmission controller may transmit a chunk data label corresponding to the content data, previously transmitted to the specific local caching device, to the selected local caching device such that the selected local caching device transmits the content data stored therein to the mobile node according to the chunk data label.

The flow information may include at least one of content transmission state information and TCP information.

The communication interface may communicate with the plurality of local caching devices through one of the mobile network, the internet and a leased line.

The object of the present invention can be achieved by providing a local caching device, including: a storage unit for storing some or all content data; an interface for communicating with the other local caching devices distributed in a mobile network and a mobile CDN controller;

and a controller for detecting a hand-over of a mobile node during transmission of the stored content data to the mobile node and informing the mobile CDN controller or the other local caching device of the hand-over of the mobile node upon detection of the hand-over of the mobile node.

The controller may transmit at least one of content transmission state information and TCP information to the mobile CDN controller or the selected local caching device.

The controller may redirect transmission of the content data to the mobile CDN controller such that the content data is delivered to the mobile node through the mobile CDN controller after hand-over notification.

The object of the present invention can be achieved by providing a method of providing mobile content during a hand-over at a mobile CDN controller, the method including: receiving a signal representing a hand-over of a mobile node from a specific local caching device currently transmitting content data to the mobile node; determining a selected one of local caching devices capable of transmitting the content data to the mobile node from among local caching devices distributed in a mobile network; checking whether the selected local caching device stores the content data; and controlling the content data stored in one of the specific local caching device, the selected local caching device and a origin server to be transmitted to the mobile node according to whether the selected local caching device stores the content data.

The controlling of the content data to be transmitted to the mobile node may include transmitting flow information necessary to transmit the content data to the mobile node to the selected local caching device when the selected local caching device stores the content data.

The method may further include setting a content blocking state such that the content data received from the origin server is not transmitted to the mobile network when the content data is transmitted to the mobile node from the specific local caching device. The controlling of the content data to be transmitted to the mobile node may include revoking the content blocking state such that the content data transmitted from the origin server is delivered to the mobile node through the mobile network when the selected local caching device does not store the content data.

The controlling of the content data to be transmitted to the mobile node may include receiving the content data from the specific local caching device and delivering the content data to the mobile node through the mobile network when the selected local caching device does not store the content data.

The object of the present invention can be achieved by providing a method of providing mobile content during a hand-over at a mobile CDN controller, the method including: setting a content blocking state such that content data received from a origin server is not delivered to a mobile network while content data is transmitted to a mobile node from a specific local caching device distributed in the mobile network; receiving a signal representing a hand-over of the mobile node from the specific local caching device; and revoking the content blocking state such that the content data received from the origin server is delivered to the mobile node through the mobile network upon reception of the signal representing the hand-over of the mobile node.

The object of the present invention can be achieved by providing a method of providing mobile content during a hand-over at a mobile CDN controller, the method including: receiving a signal representing a hand-over of a mobile node from a local caching device currently transmitting content data to the mobile node; receiving content data destined for the mobile node from the local caching device; and delivering the received content data to a packet core of a mobile network such that the received content data is delivered to the mobile node through a wireless access network to which the mobile node has been handed over.

The object of the present invention can be achieved by providing a method of providing mobile content during a hand-over at a local caching device, the method including: detecting a hand-over of a mobile node during transmission of content data to the mobile node; informing a mobile CDN controller of the hand-over of the mobile node; determining a selected one of local caching devices capable of providing content to the handed-over mobile node; checking whether the selected local caching device stores the content; and transmitting flow information including at least one of content transmission state information and TCP information to the selected local caching device directly or through the mobile CDN controller such that the selected local caching device transmits the content data when the selected local caching device stores the content data.

The method may further include transmitting the content data to the mobile CDN controller such that the content data is transmitted to the mobile node according to relay of the mobile CDN controller when the selected local caching device does not store the content data.

In provision of content to a mobile node connected to each wireless access network through local caching devices distributed in a mobile network, the present invention can confirm a local caching device corresponding to a wireless access network to which the mobile node has been handed over through a mobile CDN controller when hand-over of the mobile node occurs and seamlessly provide content to the mobile node through the confirmed local cache device with stability.

Particularly, when a hand-over of the mobile node occurs during provision of content to the mobile node through a specific caching device, the present invention can deliver content transmitted from a content providing origin server to the handed-over mobile node by permitting content flow from the origin server, blocked by the mobile CDN controller, or redirect transmission of content from the local caching device to the handed-over mobile node through the mobile CDN controller, achieving seamless provision of content even during a hand-over.

DETAILED DESCRIPTION OF THE PREFERRED EMBODIMENTS

In the following description, numerous specific details are set forth. However, it is understood that embodiments of the invention may be practiced without these specific details. In other instances, well-known functions or configurations have not been shown in detail in order not to obscure an understanding of this description. The same reference numbers will be used throughout this specification to refer to the same or like parts.

The present invention provides content provided by a content providing origin server to a mobile node connected to a mobile network. Particularly, the present invention seamlessly provides content even during a hand-over of the mobile node. The present invention is based on a mobile network including a plurality of wireless access networks and a core network connecting the plurality of wireless access networks, and the mobile network will now be described with reference to FIG. 1.

Figure 1:
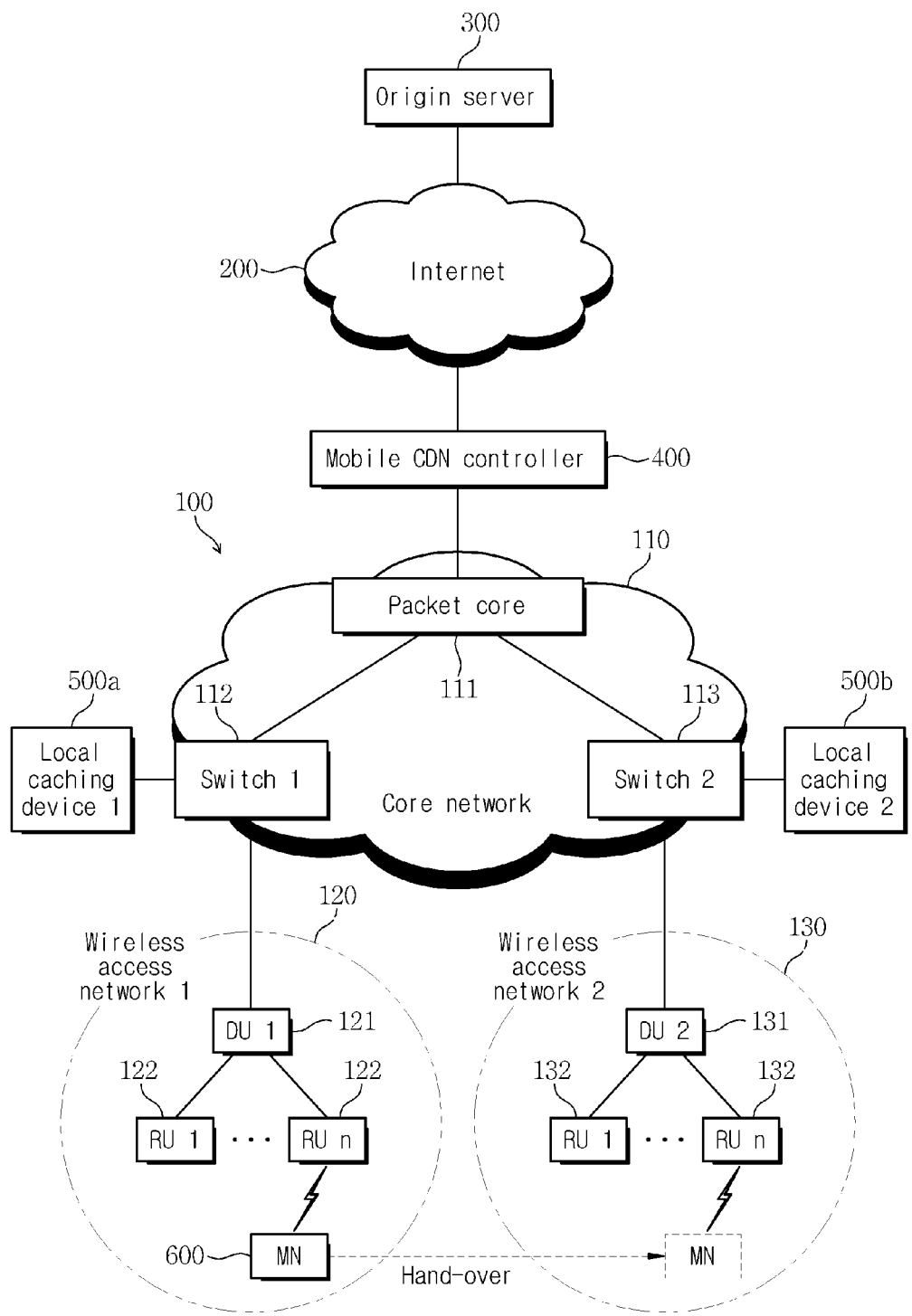
FIG. 1 illustrates a configuration of a network in which mobile content is provided according to the present invention.

FIG. 1 illustrates a configuration of a network for mobile content provision according to the present invention.

In FIG. 1, reference numeral 100 denotes a mobile network through which mobile content transmission according to the present invention is performed. The mobile network 100 is a communication network through which a user can use a communication service while moving and may include various types of wireless networks including Wi-Fi network and combinations thereof in addition to LTE (Long Term Evolution) network, WCDMA network, etc.

The mobile network 100 may include a plurality of wireless access networks 120 and 130 and a core network 110 that connects the wireless access networks 120 and 130 or connects the wireless access networks 120 and 130 to an external network, specifically, the Internet 200.

The wireless access networks 120 and 130 performs wireless communication with a mobile node 600 corresponding to a terminal that can access a mobile network, such as a smartphone, and may include a plurality of base stations such as BTSs (Base Transceiver Stations), NodeBs, eNodeBs, etc. and a base station controller such as a BSC (Base Station Controller), RNC (Radio Network Controller), etc.

Alternatively, digital signal processors integrated with the base stations may be separated as digital units (DUs) 121 and 131 and radio signal processors integrated with the base stations may be separated as a plurality of radio units (RUs) 122 and 132. The plurality of RUs 122 and 132 may be respectively installed in a plurality of areas and connected to the centralized DUs 121 and 131.

The core network 110 is a network system that performs main functions for mobile communication service, such as call processing, mobility control and switching. While the core network 110 can be composed of various functional elements, FIG. 1 shows only a packet core (EPC: Evolved Packet Core) 111 and switches 112 and 113, which are necessary to describe a method for providing mobile content according to the present invention.

The packet core 111 is included in the core network 110, manages and controls packet flow in the mobile network 100, and performs interoperation of the mobile network 100 and the external network, that is, the Internet 200.

While the mobile network 100 can include various functions in addition to the above-described configuration, description and illustration thereof are omitted for convenience.

The Internet 200 is a public communication network through which information is exchanged according to TCP/IP and can be constructed through one or more of wired, wireless and optical communication technologies. Various services such as an instant message service, The Internet portal service, a social network service, an electronic commerce service, etc. are provided on the basis of the Internet 200.

In the present invention, a content providing apparatus (referred to as a origin server 300 hereinafter) of a content provider (CP) having various types of content and providing the content to users is connected to the Internet 200. In addition, a plurality of devices (e.g. GLB (Global Load Balance) devices, local cache devices, etc.) for dispersing load of a process of delivering content provided by the origin server 300 can be connected to the Internet 200.

To stably provide content to the mobile node 600 in consideration of hand-over, the above-described network structure includes a plurality of local caching devices 500a and 500b connected to the mobile network 100, particularly, the core network 110, and a mobile CDN (Content Delivery Network) controller 400 for controlling and managing content provision of the local caching devices 500a and 500b.

The local caching devices 500a and 500b are main components performing mobile content delivery according to the present invention. The local caching devices 500a and 500b store some or all content provided by the origin server 300 through various methods including mirroring and caching and provide stored content to the mobile node 600 linked to the mobile network 100 when the mobile node 600 requests content. The local caching devices 500a and 500b may divide content into chunks each corresponding to a significant unit having a predetermined size and store the content by caching the content on a chunk basis. Alternatively, the local caching devices 500a and 500b may store whole content data instead of dividing the content data into chunks.

Content may be provided to the mobile node 600 according to two methods. The first method receives information on the label of chunk data from the mobile CDN controller 400 in real time and transmits chunk data of content corresponding to the label to the mobile node 600. In this case, the local caching devices 500a and 500b perform only transmission of the chunk data of the content in a designated order under the control of the mobile CDN controller 400, and content retransmission and TCP processing such as TCP congestion control are performed by the origin server 300. The first method is referred to as byte caching hereinafter.

According to the second method, the local caching devices 500a and 500b directly transmit content to the mobile node 600 without control of the mobile CDN controller 400 after receiving only content service information from the mobile CDN controller 400. In this case, the TCP processing is performed by the local caching devices 500a and 500b. That is, the local caching devices 500a and 500b can monitor a TCP response message of the mobile node 600, retransmit requested content data or adjust a data rate according to a network congestion state.

The local caching devices 500a and 500b are distributed in the mobile network 100. For example, the local caching devices 500a 500b can be located respectively corresponding to the wireless access networks 120 and 130. More specifically, the local caching devices 500a and 500b are connected between the packet core 111 of the mobile network 100 and the DUs 121 and 131 of the wireless access networks 120 and 130 via the switches 112 and 113, respectively. The local caching devices 500a and 500b monitor transmission/reception packets of the mobile node 600, which are delivered between the packet core 111 and the DUs 121 and 131, to check a specific content request message of the mobile node 600 and, when content corresponding to the content request message is stored in the local caching devices 500a and 500b, provides the stored content to the mobile node 600.

A transmission/reception packet (referred to as a mobile packet hereinafter) of the mobile node 600, which is delivered on the mobile network 100, is transmitted using tunneling, distinguished from a packet delivered on the Internet. Provided that the mobile node 600 transmits a content request message, when the mobile node 600 transmits an IP packet including origin address information (address information of the mobile node 600) and destination address information (address information of the origin server 300) to the wireless access network 120, a BS (e.g. enodeB) of the wireless access network 120 converts the IP packet to a mobile packing by adding a GTP header including tunneling identification information of the mobile node 600, a UDP header and an IP header for GTP tunneling to the IP packet and transmits the mobile packet to the core network 110. The core network 110 removes the GTP header, UDP header and IP header for GTP tunneling from the mobile packet and transmits the original IP packet transmitted from the mobile node 600 to the origin server 300 through the Internet 200. Here, the origin address information of the original IP packet may be changed by a NAT (Network Address Translator). When content is transmitted from the origin server 300 to the mobile node 600, the core network 110 receives an IP packet destined for the mobile node 600 from the Internet 200, converts the IP packet to a mobile packet by adding a GTP header, a UDP header and an IP header for GTP tunneling to the IP packet, and transmits the mobile packet to the wireless access network 120. The wireless access network 120 removes the GTP header, UDP header and IP header for GTP tunneling from the received mobile packet and transmits the original IP packet to the mobile node 600 through a radio period.

Accordingly, when the local caching devices 500a and 500b transmit content data to the mobile node 600 via the wireless access networks 120 and 130, the local caching devices 500a and 500b configure the content data in the form of a mobile packet generated by adding a GTP header, a UDP header and an IP header for GTP tunneling to an IP packet to be delivered from the origin server 300 to the mobile node 600 and transmit the mobile packet to the DUs 121 and 131 of the wireless access networks 120 and 130 such that the mobile packet is delivered to the mobile node 600.

The mobile CDN controller 400 manages the plurality of local caching devices 500a and 500b distributed in the mobile network 100 and controls a content delivery process performed by the local caching devices 500a and 500b. Specifically, the mobile CDN controller 400 delivers a content request message of the mobile node 600 to the origin server 300, receives content data provided by the origin server 300 and transmits the content data to the mobile node 600 via the mobile network 100. In this case, when it is confirmed that the content data is cached in the specific local caching device 500a, the mobile CDN controller 400 performs content blocking such that the content data received from the origin server 300 is not delivered to the mobile network 100. Content blocking refers to a state that content data transmitted from the origin server 300 is received at the mobile CDN controller 400 but not transmitted to the mobile network 100. Here, delivery of content to the mobile node 600 is performed by the local caching device 500a.

The mobile CDN controller 400 can operate in two modes.

In the first mode (byte caching mode), the mobile CDN controller 400 transmits label information of chunk data of content received from the origin server 300 to the local caching device 500a in real time such that the local caching device 500a delivers chunk data corresponding to the label information to the mobile node 600. Here, the mobile CDN controller 400 needs to provide the label information of the chunk data to the local caching device 500a in real time until transmission of the corresponding content is ended. Content retransmission for a lost packet or TCP congestion control such as transmission rate control due to network congestion is performed by the origin server 300.

In the second mode, the mobile CDN controller 400 transmits flow information (including information necessary to process a TCP packet) necessary to transmit the content to the local caching device 500a such that the content is directly delivered to the mobile node 600 from the local caching device 500a. In this case, content retransmission and TCP processing such as TCP congestion control are performed by the local caching device 500a.

As described above, the mobile node 600 may be handed over as the user moves during delivery of content from the specific local caching device 500a to the mobile node 600.

The local caching devices 500a and 500b according to the present invention detect a hand-over of the mobile node 600 while providing content to the mobile node 600. When the local caching devices 500a and 500b confirm that the mobile node 600 moves out of the coverage of the wireless access networks 120 and 130 corresponding thereto, the local caching devices 500a and 500b inform the mobile CDN controller 400 of the hand-over of the mobile node 600 such that the handed-over mobile node 600 can continuously receive remaining data of the content according to a control or relaying operation of the mobile CDN controller 400. A hand-over of the mobile node 600 may be detected in various manners. Specifically, the local caching devices 500a and 500b may detect a hand-over of the mobile node 600 through interoperation with the mobile network 100, or the local caching devices 500a and 500b may detect a hand-over of the mobile node 600 by monitoring various call processing messages exchanged between the packet core 111 and the wireless access network 120 to detect a signaling message related to the hand-over of the mobile node 600. However, the present invention is not limited thereto and the local caching devices 500a and 500b can detect a hand-over of the mobile node 600 in various manners.

Methods of providing content during a hand-over according to embodiments of the present invention may be discriminated from one another on the basis of the origin from which content delivered to the handed-over mobile node 600 is originated. The embodiments of the present invention will now be described with reference to FIGS. 2, 3 and 4.

The following description will be given on the assumption that the mobile node 600 is handed over to the wireless access network 130 while being connected to the wireless access network 120 and receiving content from the local caching device 500a.

Figure 2:
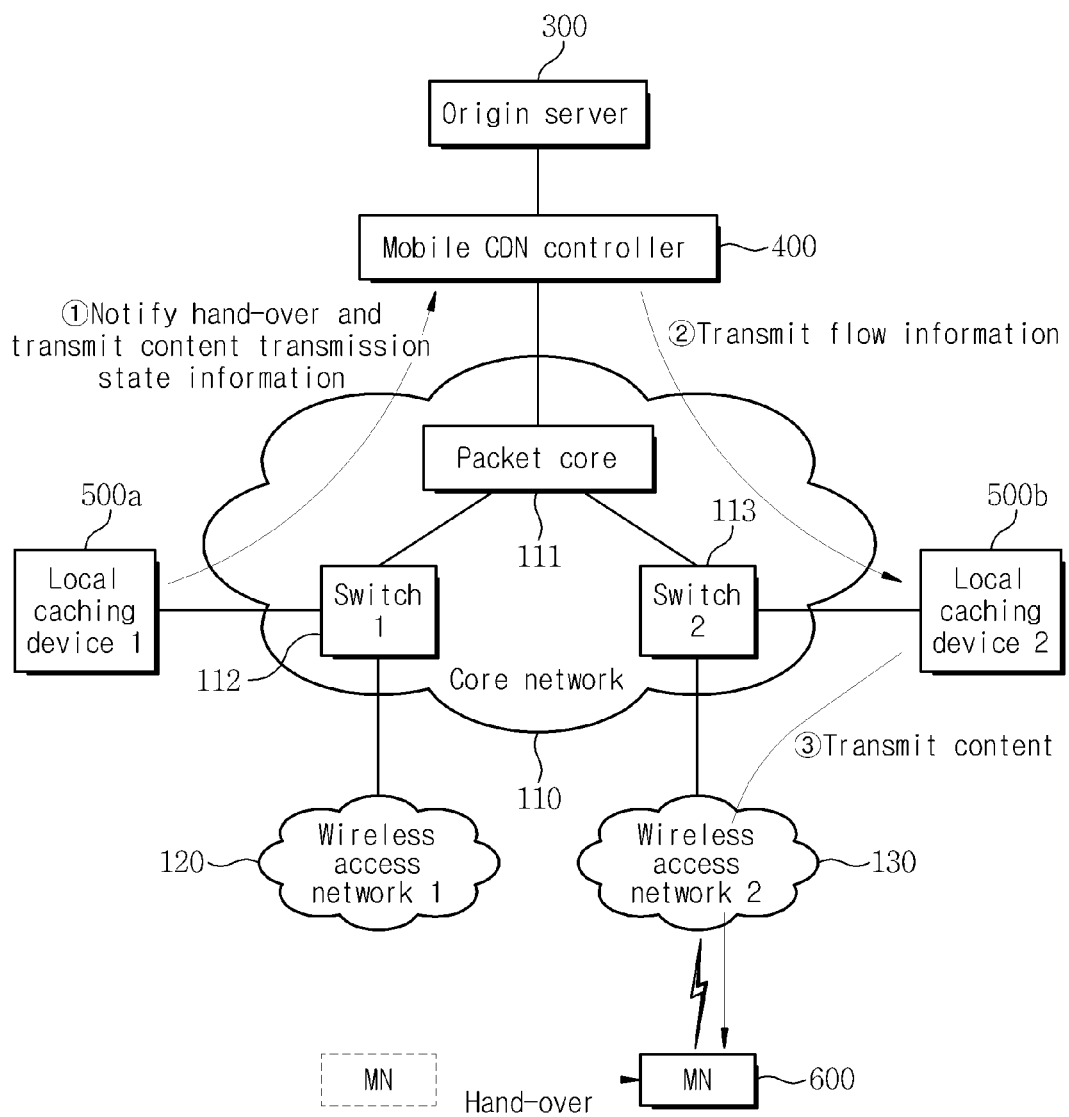
FIGS. 2 to 4 show content data delivery paths during a hand-over in the network configuration shown in FIG. 1 according to a content providing method according to embodiments of the present invention.
Figure 3:
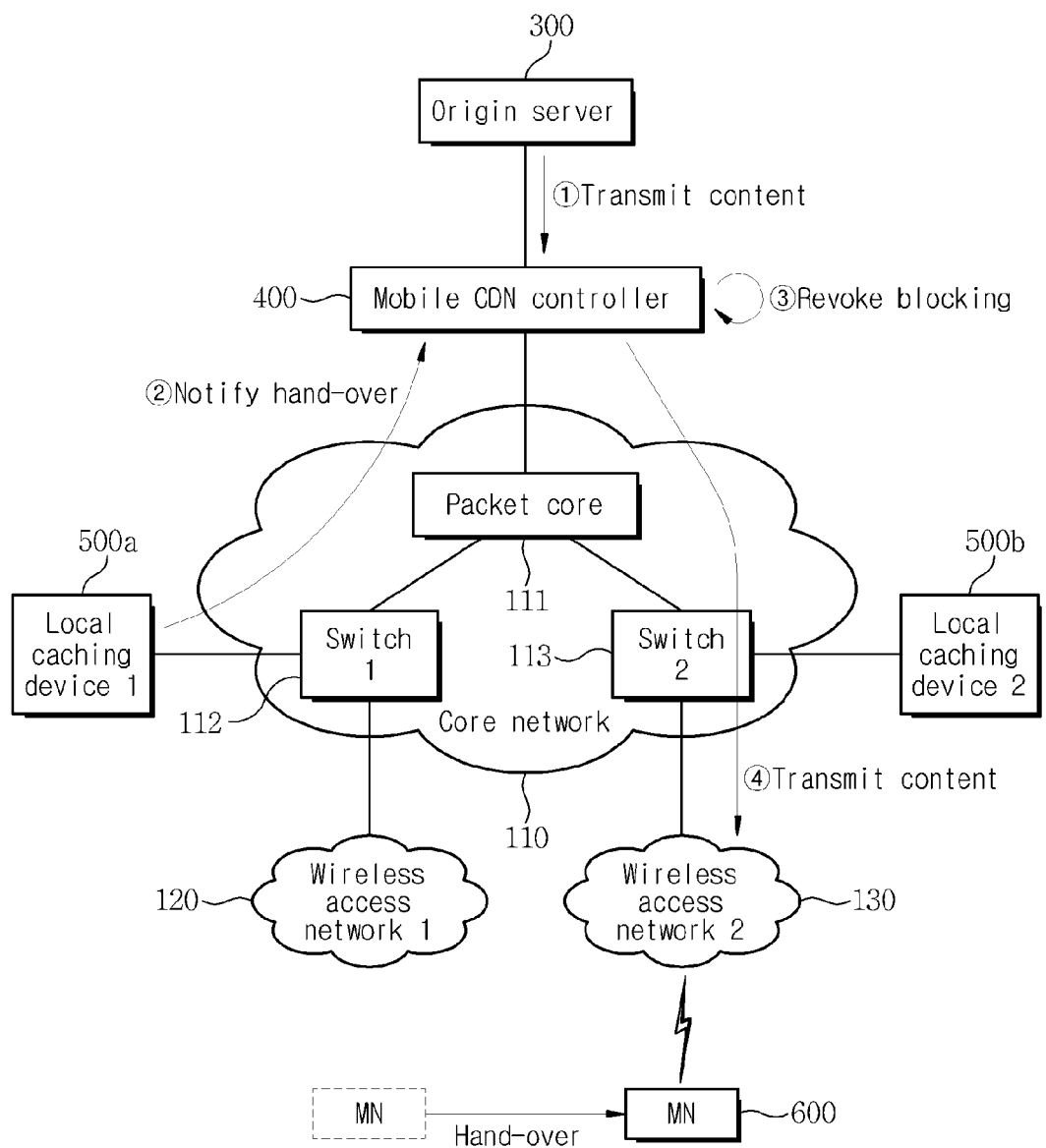
Figure 4:
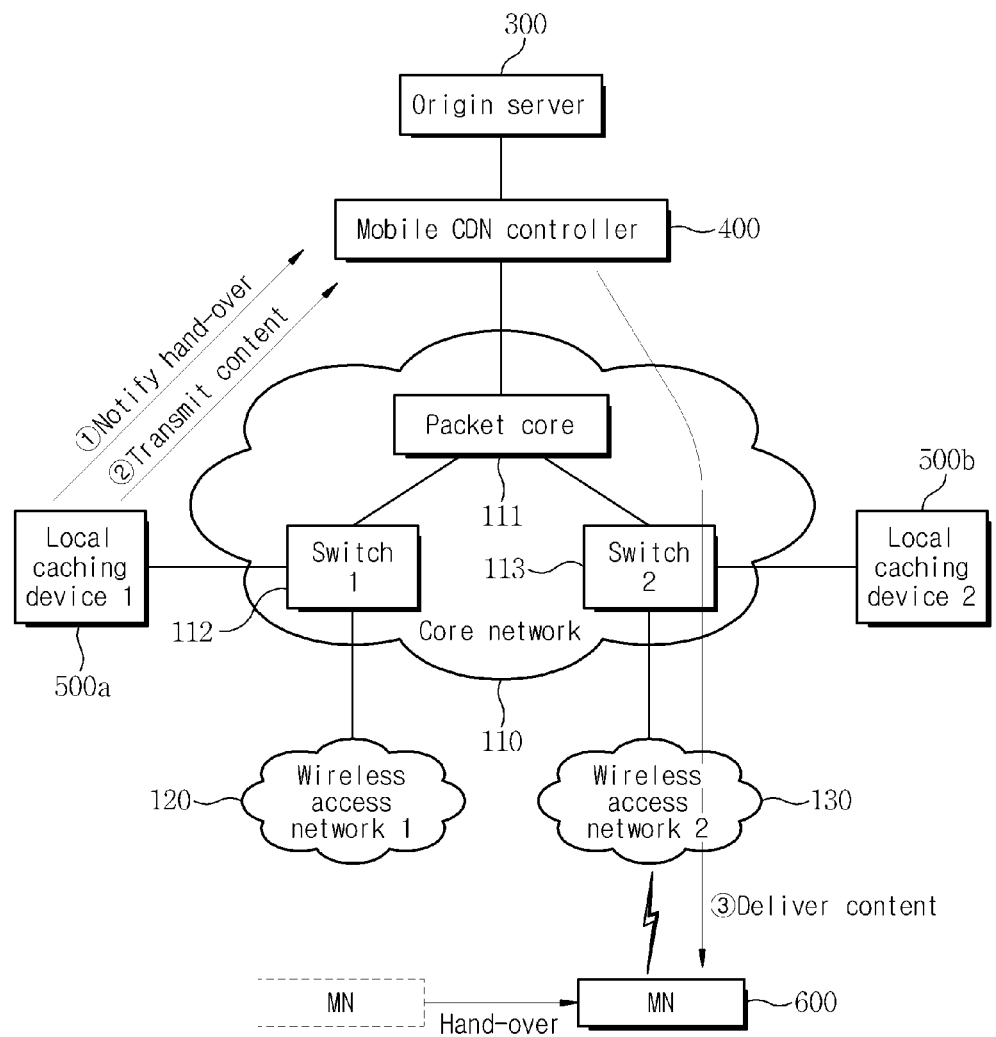

FIGS. 2, 3 and 4 show data flows according to methods of providing content during a hand-over according to embodiments of the present invention.

Referring to FIG. 2, in the first embodiment of the present invention, upon detection of a hand-over of the mobile node 600 while transmitting content to the mobile node 600, the local caching device 500a informs the mobile CDN controller 400 of the hand-over of the mobile node 600 (①). Here, the local caching device 500a can transmit, to the mobile CDN controller 400, content transmission state information representing part of the content, which has been transmitted to the mobile node 600, and TCP information for TCP processing. In addition, if the local caching device 500a knows information regarding hand-over of the mobile node 600, the local caching device 500a can also transmit the hand-over information of the mobile node 600. The hand-over information of the mobile node 600 may correspond to one of information about the wireless access network 130 to which the mobile node 600 has been handed over and information about the local caching device 500b that provides content to the wireless access network 130.

When the mobile CDN controller 400 is informed of the hand-over of the mobile node 600, the mobile CDN controller 400 selects another local caching device 500b that can provide content to the mobile node 600 using at least one of the hand-over information of the mobile node 600, received from the local caching device 500a, and previously managed position information of the plurality of local caching devices 500a and 500b distributed in the mobile network 100, requests the selected local caching device 500b to transmit the content and, simultaneously, transmits flow information necessary to transmit the content (②). The flow information may include the content transmission state information and TCP information received from the local caching device 500a.

It is assumed that the other local caching device 500b caches and stores the content in advance.

Upon reception of the content transmission request and the flow information from the mobile CDN controller 400, the local caching device 500b converts the content cached therein into a mobile packet destined for the mobile node 600 with reference to the flow information and transmits the mobile packet to the wireless access network 130 (③).

Transmission of content from the local caching device 500b to the mobile node 600 may be performed according to the above-described byte caching scheme. In this case, the mobile CDN controller 400 transmits label information about chunk data of the content, previously transmitted to the local caching device 500a, to the other local caching device 500b. Upon reception of the label information, the local caching device 500b delivers chunk data of content corresponding to the received label information to the mobile node 600.

The first embodiment is suitable for a case in which the local caching device 500b corresponding to the wireless access network to which the mobile node 600 has been handed over caches the corresponding content. When the mobile CDN controller 400 operates in the byte caching mode, the mobile CDN controller 400 transmits label information of chunk data previously transmitted to the previous local caching device 500a to the new local caching device 500b, and thus the handed-over mobile node 600 can seamlessly receive the content. On the contrary, when the mobile CDN controller 400 does not operate in the byte caching mode, the mobile CDN controller 400 provides flow information necessary for the new local caching device 500b to provide content to the mobile node 600 such that the local caching device 500b transmits remaining content data to the mobile node 600. The flow information needs to include content transmission state information representing part of content data, which has been transmitted to the mobile node 600 from the local caching device 500a, and TCP information.

In the first embodiment, when the mobile node 600 is handed over, content is provided through the local caching device 500b linked to the wireless access network to which the mobile node 600 has been handed over. In this case, the local caching device 500b requires to cache and store the corresponding content.

However, the local caching device 500b linked to the wireless access network to which the mobile node 600 has been handed over may not store the content. Second and third embodiments may be applied to a case in which the local caching device 500b linked to the wireless access network to which the mobile node 600 has been handed over does not store the content.

FIG. 3 shows a packet path during a hand-over according to the second embodiment of the present invention. While content data stored in the local caching device 500a is transmitted to the mobile node 600, the mobile CDN controller 400 maintains a content blocking state in which the mobile CDN controller 400 receives the content data from the origin server 300 but does not transmit the received content data to the mobile network 100 (①).

In the content blocking state, when the local caching device 500a detects a hand-over of the mobile node 600 and informs the mobile CDN controller 400 of the hand-over (②), the mobile CDN controller 400 revokes the content blocking state (③). That is, the mobile CDN controller 400 delivers content data transmitted from the origin server 300 to the mobile network 100, more specifically, the packet core 111 of the core network 110 instead of blocking the content.

Here, the content data transmitted from the origin server 300 is in the form of an IP packet destined for the mobile node 600.

Accordingly, the content data delivered to the mobile network 100 through the mobile CDN controller 400 is transmitted to the mobile node 600 through processing in the mobile network 100 (④).

More specifically, upon reception of the content data from the mobile CDN controller 400, the packet core 111 confirms the destination of the content data, that is, the location of the mobile node 600. Here, since the mobile node 600 has been handed over to the wireless access network 130, the packet core 111 converts the content data into a mobile packet destined for the BS (e.g. eNodeB) of the wireless access network 130 and transmits the mobile packet to the wireless access network 130. Upon reception of the mobile packet, the BS of the wireless access network 130 restores the IP packet corresponding to the content data and transmits the IP packet to the mobile node 600.

During this process, a gap may be generated between the last part of the content, received by the mobile node 600 from the local caching device 500a via the wireless access network 120, and the first part of the content, received by the mobile node 600 from the origin server 300 via the wireless access network 130 after hand-over, and thus the mobile node 600 may miss some of the content. In this case, the mobile node 600 transmits a content retransmission request to the origin server 300 according to the conventional TCP procedure, and thus the missed part of the content is retransmitted to the mobile node 600 from the origin server 300.

Accordingly, the mobile node 600 can seamlessly receive the content even during a hand-over.

In the second embodiment, content is delivered from the origin server 300 to the mobile node 600 during a hand-over of the mobile node 600. The second embodiment is applicable to a case in which the mobile CDN controller 400 operates in the byte caching mode as well as a case in which the mobile CDN controller 400 does not operate in the byte caching mode.

FIG. 4 illustrates a content delivery process during a hand-over according to the third embodiment of the present invention. Referring to FIG. 4, upon detection of a hand-over of the mobile node 600 while providing content to the mobile node 600, the local caching device 500a informs the mobile CDN controller 400 of the hand-over of the mobile node 600 (①).

Then, the local caching device 500a transmits content data, previously delivered through the wireless access network 120, to the mobile CDN controller 400 (②). Here, content data transmission from the local caching device 500a to the mobile CDN controller 400 may be performed using tunneling (e.g. GRE tunneling).

Upon reception of the content data from the local caching device 500a, the mobile CDN controller 400 transmits the received content data to the mobile network 100 (③).

The content data transmitted from the local caching device 500a to the mobile node 600 through the mobile CDN controller 400 is an IP packet destined for the mobile node 600, and the mobile CDN controller 400 transmits the IP packet to the mobile network 100, specifically, the packet core 111 of the core network 110 such that the IP packet is delivered to the wireless access network 130 to which the mobile node 600 has been handed over via the packet core 111 that controls mobility (hand-over) and packet flow in the mobile network 100 and then transmitted to the mobile node 600 via the wireless access network 130. Here, content data transmission from the local caching device 500a to the mobile CDN controller 400 may be performed through the mobile network 100, a dedicated network other than the mobile network 100, or the Internet.

As described above, the local caching device 500*a* can seamlessly transmit content to the mobile node 600 that has been handed over to the other wireless access network 130.

In the third embodiment, the local caching device 500*a* seamlessly provides content to the mobile node 600 through the mobile CDN controller 400 during a hand-over of the mobile node 600.

Configurations and operations of the above-described mobile CDN controller 400 and the local caching devices 500*a* and 500*b* according to the present invention will now be described with reference to FIGS. 5 and 6.

Figure 5:
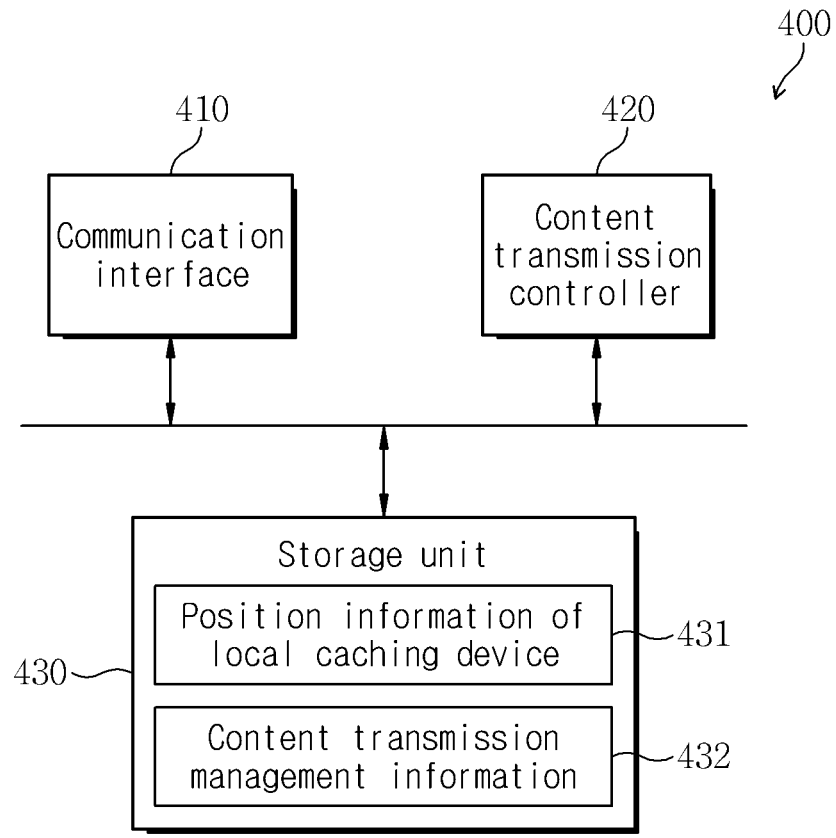
FIG. 5 is a block diagram showing a configuration of a mobile CDN controller according to an embodiment of the present invention.

FIG. 5 is a block diagram showing a configuration of the mobile CDN controller 400 according to an embodiment of the present invention.

Referring to FIG. 5, the mobile CDN controller 400 according to the present invention may include a communication interface 410, a content transmission controller 420 and a storage unit 430.

The communication interface 410 performs transmission/reception of data to/from the plurality of local caching devices 500*a* and 500*b* and the mobile network 100. According to an embodiment of the present invention, the plurality of local caching devices 500*a* and 500*b* and the mobile CDN controller 400 may be connected through a separate dedicated network or the Internet, or through the mobile network 100. While the mobile CDN controller 400 can communicate with the local caching devices 500*a* and 500*b* and the mobile network 100 through a communication scheme in the latter case, a separate communication interface is necessary for the plurality of local caching devices 500*a* and 500*b* in the former case. Accordingly, the communication interface may be composed of one or more communication interface modules supporting data transmission/reception according to different communication schemes. Particularly, the communication interface 410 communicates with the packet core 111 of the core network 110 when performing communication with the mobile network 100.

The content transmission controller 420 controls and manages content transmission of the plurality of local caching devices 500*a* and 500*b*. Specifically, when detection of a hand-over of the mobile node 600 during content transmission from the specific local caching device 500*a* is signaled through the communication interface 410, the content transmission controller 420 determines the local caching device 500*b* that will provide content through the wireless communication area to which the mobile node 600 has been handed over and controls content hand-over for the mobile node 600 according to whether the determined local caching device 500*b* stores the content. The local caching device 500*b* that will provide content may be determined on the basis of hand-over information of the mobile node 600, received from the previous local caching device 500*a*. Whether the local caching device 500*b* stores the content may be checked by inquiring of the local caching device 500*b* whether the content is stored therein or by previously storing and managing information about content cached in the local caching device 500*b* and searching stored management information.

More specifically, when the content is stored in the determined local caching device 500*b*, the content transmission controller 420 receives the content transmission state information representing part of the content, which has been transmitted to the mobile node 600, and TCP information for TCP processing from the local caching device 500*a* that has provided the content before the hand-over of the mobile node 600, generates flow information including at least one of the received content transmission state information and TCP information and provides the flow information to the local caching device 500*b* such that the local caching device 500*b* can transmit the remaining part of the content to the mobile node 600 according to the first embodiment. Here, the TCP information is necessary for TCP processing and may include a TCP sequence number, state information, information representing whether a response message is received, etc. When the mobile CDN controller 400 operates in the byte caching mode, the content transmission controller 420 transmits a chunk data label, previously provided to the local caching device 500*a*, to the local caching device 500*b*. Accordingly, the local caching device 500*b* instead of the local caching device 500*a* transmits data corresponding to the chunk data label to the mobile node 600.

When the content is not stored in the local caching device 500*b*, the content transmission controller 420 receives the content from the local caching device 500*a* or the origin server 300 and relays the content to the mobile node 600.

That is, the mobile CDN controller 400 blocks delivery of content data transmitted from the origin server 300 to the mobile network 100 while the local caching device 500*a* provides the content to the mobile node 600. According to the second embodiment of the present invention, when the specific local caching device 500*a* informs the mobile CDN controller 400 of a hand-over of the mobile node 600 to which the local caching device 500*a* currently delivers content and the content is not stored in the local caching device 500*b* linked to the wireless access network to which the mobile node 600 has been handed over, the content transmission controller 420 revokes blocking of the content destined for the mobile node 600 and transmits the corresponding content data received from the origin server 300 to the mobile network 100, particularly, the packet core 111 of the core network 110. The content data transmitted from the origin server 300 is delivered to the mobile node 600 through the wireless access network 130 to which the mobile node 600 has been handed over under the control of the packet core 111. The second embodiment is applicable to a case in which the mobile CDN controller does not operate in the byte caching mode as well as a case in which the mobile CDN controller operates in the byte caching mode.

According to the third embodiment, when the specific local caching device 500*a* informs the mobile CDN controller 400 of a hand-over of the mobile node 600 to which the local caching device 500*a* currently provides content and the content is not stored in the local caching device 500*b* linked to the wireless access network to which the mobile node 600 has been handed over, the content transmission controller 420 receives the content data destined for the mobile node 600 from the previous local caching device 500*a* using tunneling and transmits the received content data to the packet core 111 of the mobile network 100. In this case, the packet core 111 of the mobile network 100 confirms the destination (IP address of the mobile node 600) of the received content data and transmits the content data to the wireless access network 130 in which the mobile node 600 is located such that the content data is delivered to the mobile node 600 through the BS of the wireless access network 130.

The third embodiment may be more preferable for a case in which the mobile CDN controller does not operate in the byte caching mode, that is, a case in which the local caching devices 500*a* and 500*b* perform content delivery and TCP processing.

The storage unit 430 stores data and programs generated during the above-described control process of the content transmission controller 420 or necessary for the control process. Particularly, the storage unit 430 stores position information 431 and content transmission management information 432 of the local caching devices 500a and 500b. The content transmission management information may include information about content cached by the local caching devices 500a and 500b. In addition, the content transmission management information may include one or more of the content transmission state information, the TCP information and the hand-over information of the mobile node 600, received from the local caching device 500a that informs the mobile CDN controller of the hand-over of the mobile node 600.

The configuration of the local caching devices 500a and 500b according to the present invention will now be described.

Figure 6:
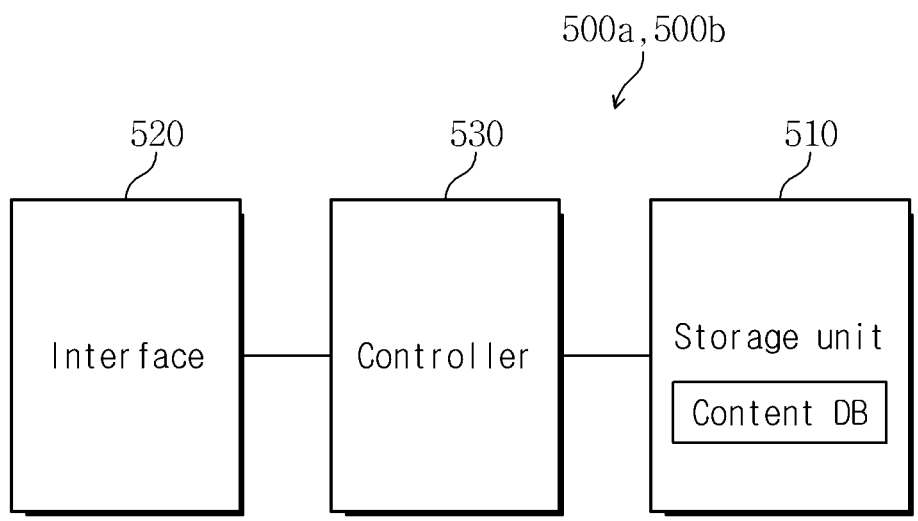
FIG. 6 is a block diagram showing a configuration of a local caching device according to an embodiment of the present invention.

FIG. 6 is a block diagram showing the configuration of the local caching devices 500a and 500b according to an embodiment of the present invention. Referring to FIG. 6, the local caching devices 500a and 500b may include a storage unit 510, an interface 520 and a controller 530.

The storage unit 510 stores some or all content provided by the origin server 300. Content provided by the origin server 300 may be stored in the storage unit 510 according to a mirroring method by which the local caching devices 500a and 500b receive and store mirrored traffic or a caching method by which the local caching devices 500a and 500b store content delivered at the request of the mobile node 600 according to a predetermined caching policy in addition to a distribution method using a separate distribution apparatus.

The interface 520 transmits/receives data to/from one of the mobile network 100, other local caching devices and the mobile CDN controller 400. While the local caching devices 500a and 500b can transmit/receive data to/from the mobile CDN controller 400 through the mobile network 100 as described above, transmission/reception of data between the local caching devices 500a and 500b and the mobile CDN controller 400 may be performed through a separately connected leased line or the internet. Accordingly, the interface 520 may include one or more different interface modules according to a communication scheme for communication between the local caching devices 500a and 500b and the mobile CDN controller 400.

To provide content to the mobile node 600 linked to the wireless access networks 120 and 130, the interface 520 may include a mirroring interface module for mirroring mobile packets transmitted between the packet core 111 and the DUs 121 and 131 of the wireless access networks 120 and 130 through the switches 112 and 113 and providing the mirrored mobile packets to the controller 530 and an injection interface module for transmitting a mobile packet including content data generated by the controller 530 to the mobile network 100.

Here, mirroring refers to a technique of copying a mobile packet transmitted through the mobile network 100 without affecting traffic. The mirroring interface module copies all packets transmitted through the switches 112 and 113 of the mobile network 100 and delivers the copied packets to the controller 530.

The controller 530 controls content transmission to the mobile node 600, particularly, content transmission according to a hand-over of the mobile node 600.

More specifically, the controller 530 monitors mobile packets transmitted between the wireless access networks 120 and 130 and the packet core 111 of the core network 110 through the switches 112 and 113. When the mobile node 600 requests specific content and the requested content is stored in the storage unit 510, the controller 530 informs the mobile CDN controller 4100 that the content to be provided to the mobile node 600 is stored in the storage unit 510, generates a mobile packet destined for the mobile node 600, which includes content data stored in the storage unit 510, and delivers the mobile packet including the content data to the corresponding wireless access networks 120 and 130 through the switches 112 and 113. In the byte caching mode, the controller 530 transmits chunk data of content corresponding to a chunk data label transmitted from the mobile CDN controller 400 to the mobile node 600 through the wireless access networks 120 and 130. When the process is not performed in the byte caching mode, the controller 530 sequentially reads content data stored in the storage unit 510 and transmits the read content data to the mobile node 600 through the wireless access networks 120 and 130 with reference to the flow information provided by the mobile CDN controller 400.

During transmission of content to the mobile node 600, the controller 530 detects a hand-over of the mobile node 600. A hand-over of the mobile node 600 may be detected in various manners. For example, a hand-over of the mobile node 600 can be detected by detecting a hand-over related signaling message exchanged between the wireless access networks 120 and 130 and the packet core 111.

In addition, when a hand-over of the mobile node 600 is detected during transmission of content, the controller 530 informs the mobile CDN controller 400 of the hand-over of the mobile node 600. Furthermore, the controller 530 transmits, to the mobile CDN controller 400, information necessary to transmit content to the handed-over mobile node 600 according to relay of the mobile CDN controller 400, specifically, one or more of content transmission state information representing part of content, which has been transmitted to the mobile node 600, TCP information for TCP processing, and hand-over information of the mobile node 600. The mobile CDN controller 400 controls transmission of content to the handed-over mobile node 600 on the basis of the information transmitted from the controller 530. According to another embodiment of the present invention, when another local caching device capable of providing content to the handed-over mobile network 600 is known, the controller 530 may directly transmit one or more of the content transmission state information, the TCP information for TCP processing and the hand-over information of the mobile node 600 to the other local caching device.

In the first and second embodiments of the present invention, content is delivered by the other local caching device using the content transmission state information, TCP information for TCP processing and hand-over information of the mobile node 600, transmitted under the control of the controller 530, or content data transmitted from the origin server 300 is delivered to the handed-over mobile node 600 when the mobile CDN controller 400 revokes content blocking. In this case, the controller 530 interrupts transmission of content data, performed through the wireless access network to which the local caching device including the controller 530 is linked, after transmitting the hand-over notification, content transmission state information, TCP information for TCP processing and hand-over information of the mobile node 600.

In the third embodiment of the present invention, after notifying detection of a hand-over of the mobile node 600, the controller 530 transmits content data destined for the mobile node 600 to the mobile CDN controller 400 through a leased line, the Internet or the mobile network 100. The transmitted content data is delivered to the handed-over mobile node 600 through the mobile network 100 according to relay of the mobile CDN controller 400.

A description will be given of a process of transmitting content in consideration of a hand-over, which is performed by the mobile CDN controller 400 and the local caching devices 500a and 500b configured as above.

The following description is based on the assumption that the mobile node 600 is handed over to the wireless access network 130 while the local caching device 500a currently provides content to the mobile node 600 through the wireless access network 120.

Figure 7:
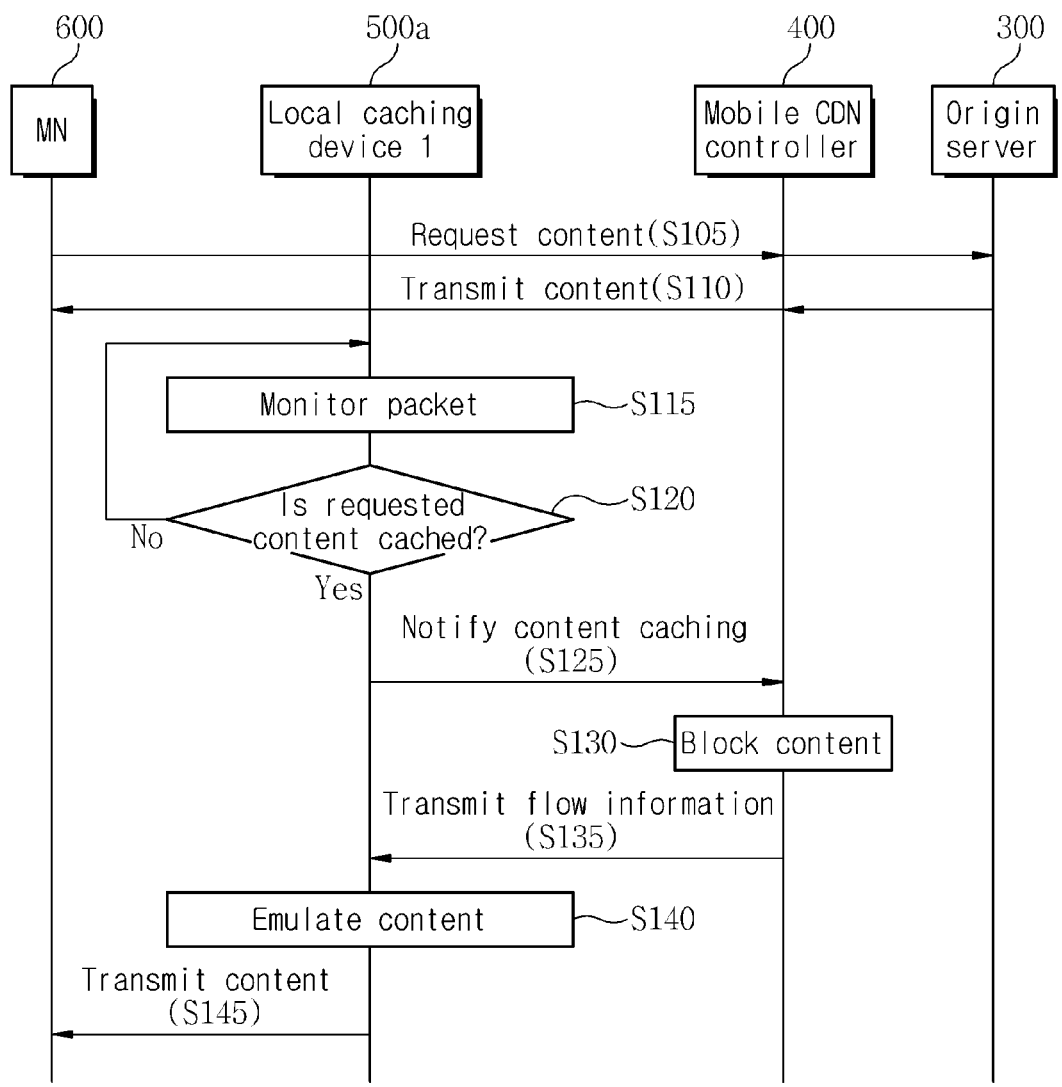
FIG. 7 is a flowchart illustrating an initial content providing process in a mobile content providing method according to an embodiment of the present invention.

FIG. 7 is a flowchart illustrating an initial content providing process for providing content at the request of the mobile node 600 in a mobile content providing method according to an embodiment of the present invention.

Referring to FIG. 7, the mobile node 600 linked to the wireless access network 120 may transmit a content request message to the origin server 300 at the request of the user of the mobile node 600 (S105). The content request message may be an HTTP GET message, for example. The mobile node 600 may acquire the address of the origin server 300 through normal DNS (Domain Name Service) inquiry and transmit the HTTP GET message requesting content of a specific site to the origin server 300 using the acquired address.

The origin server 300 transmits the requested content to the mobile node 600. The content is transmitted to the mobile network 100 through the mobile CDN controller 400 and then delivered to the mobile node 600 via the mobile network 100.

The local caching device 500a linked to the wireless access network 120 to which the mobile node 600 is currently connected may monitor packets exchanged between the wireless access network 120 and the packet core 111 of the core network 110 (S115) and confirm the content request of the mobile node 600 connected to the wireless access network 120 through the monitoring.

Upon confirmation of the content request of the mobile node 600, the local caching device 500a checks whether the content requested by the mobile node 600 is stored therein (S120). When the content is cached in the local caching device 500a, the local caching device 500a informs the mobile CDN controller 400 that the content requested by the mobile node 600 is cached in the local caching device 500a (S125).

The mobile CDN controller 400 blocks content provided by the origin server 300 to prevent the content from being transmitted to the mobile network 100 (S130) and transmits flow information (including at least one of content identification information, content transmission state information including a content transmission start point, and TCP information) necessary to transmit the content to the local caching device 500a (S135). Then, the local caching device 500a reads content data stored therein with reference to the flow information, emulates the read content data into a mobile packet to be transmitted to the mobile node 600 from the origin server 300 (that is, converts the read content data into a mobile packet to be transmitted to the mobile node 600 from the origin server 300), and then transmits the mobile packet to the mobile node 600 through the wireless access network 120.

In the byte caching mode, the local caching device 500a receives chunk based label information transmitted from the mobile CDN controller 400 in real time, extracts content chunk data corresponding to the received label information and transmits the content chunk data to the mobile node 600. When the process is not performed in the byte caching mode, the local caching device 500a sequentially read the corresponding content data on the basis of the content transmission state information and TCP information and transmits the content data to the mobile node 600 and, simultaneously, performs retransmission request from the mobile node 600 or TCP congestion control.

Figure 8:
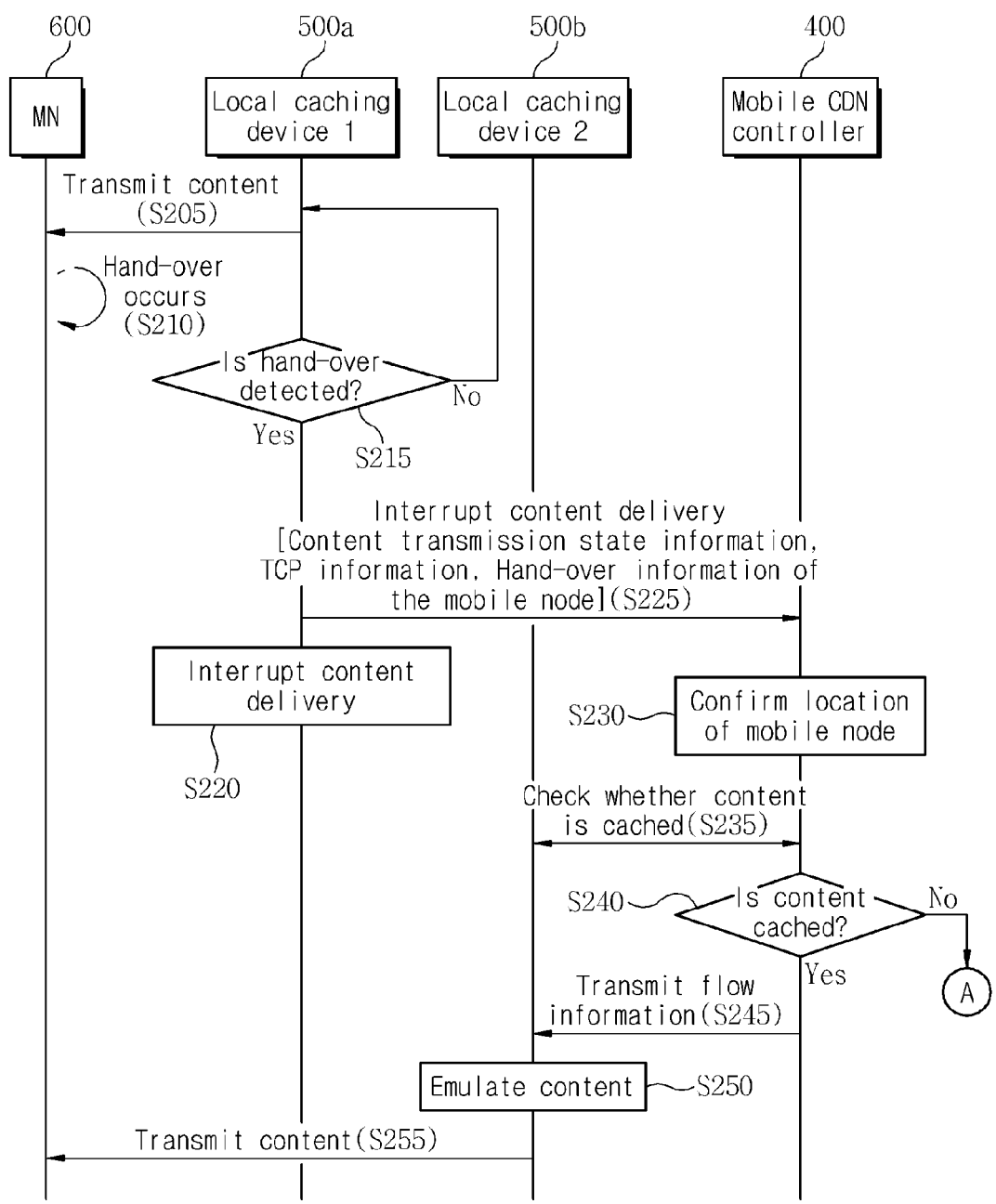
FIG. 8 is a flowchart illustrating a process of providing content during a hand-over according to a first embodiment in the mobile content providing method according to the present invention.

FIG. 8 is a flowchart illustrating a method for providing content during a hand-over according to the first embodiment of the present invention. Referring to FIG. 8, the mobile node 600 may be handed over to the neighboring wireless access network 130 as the user moves (S210) while the local caching device 500a provides content stored therein to the mobile node 600 (S205).

Accordingly, the local caching device 500a continuously monitors whether the mobile node 600 is handed over during transmission of content and, when a hand-over of the mobile node 600 is detected (S215), informs the mobile CDN controller 400 of the hand-over of the mobile node 600. In addition, the local caching device 500a transmits, to the mobile CDN controller 400, at least one of content transmission state information representing content provided to the mobile node 600 and part of the content, which has been transmitted to the mobile node 600, TCP information for TCP processing related to transmission of the content, and hand-over information of the mobile node 600 during or after notification of the hand-over (S225).

Upon reception of hand-over notification, the mobile CDN controller 400 confirms the location of the mobile node 600 and detects another local caching device 500b capable of providing content to the mobile node 600 (S230). Information on the location of the mobile mode 600 may be provided by the local caching device 500a or acquired by asking a device of the mobile network 100, such as a home location register (HLR). The mobile CDN controller 400 stores position information of the plurality of local caching devices 500a and 500b and compares the position information with the location of the mobile node 600 to determine the other local caching device 500b capable of providing content to the mobile node 600. The other local caching device 500b may be a local caching device corresponding to the wireless access network 130 to which the mobile node 600 has been handed over.

Upon determination of the other local caching device 500b capable of providing content to the handed-over mobile node 600, the mobile CDN controller 400 checks whether the local caching device 500b stores the content (S235). The mobile CDN controller 400 may perform this operation by receiving information indicating whether the local caching device 500b stores the content or by managing information about content stored in the plurality of local caching devices 500a and 500b in an integrated manner.

The mobile CDN controller 400 requests the determined local caching device 500b to provide the content by transmitting flow information necessary to transmit the content to the mobile node 600 (S245). The flow information may include at least one of the content transmission state information and TCP information received from the local caching device 500a.

Upon reception of the flow information and content transmission request from the mobile CDN controller 400, the local caching device 500b converts content data stored therein into a mobile packet destined for the mobile node 600 with reference to the flow information (S250) and transmits the mobile packet to the wireless access network 130 (S255). Transmission of the content from the local caching device 500b to the mobile node 600 in step 5255 may be performed according to various methods including byte caching.

Upon detection of the hand-over of the mobile node 600, the local caching device 500a interrupts transmission of the content to the mobile node 600 at an arbitrary time.

While a content transmission path is changed during a hand-over through the mobile CDN controller 400 in the above-described embodiment, the local caching device 500a may directly communicate with the other local caching device 500*b* without the mobile CDN controller 400 to change the content transmission path during a hand-over. Specifically, upon detection of a hand-over of the mobile node 600 in step S215, the local caching device 500*a* informs the mobile CDN controller 400 of the hand-over of the mobile node 600, and then checks whether the other local caching device 500*b* linked to the wireless communication area to which the mobile node 600 has been handed over caches the content (S235).

When the other local caching device 500*b* caches the content (S240), the local caching device 500*a* transmits the flow information including at least one of the content transmission state information and the TCP information to the other local caching device 500*b* such that the local caching device 500*b* can transmit the remaining part of the content to the handed-over mobile node 600. When the other local caching device 500*b* does not cache the content, the local caching device 500*a* transmits information indicating whether the other local caching device 500*b* caches the content to the mobile CDN controller 400 such that the mobile CDN controller 400 process content delivery.

When the local caching device 500*b* does not store the content in step S240, the content needs to be transmitted to the mobile node 600 using a different method because the local caching device 500*b* cannot provide the content. In this case, content delivery may be performed as illustrated in FIGS. 9 and 10.

Figure 9:
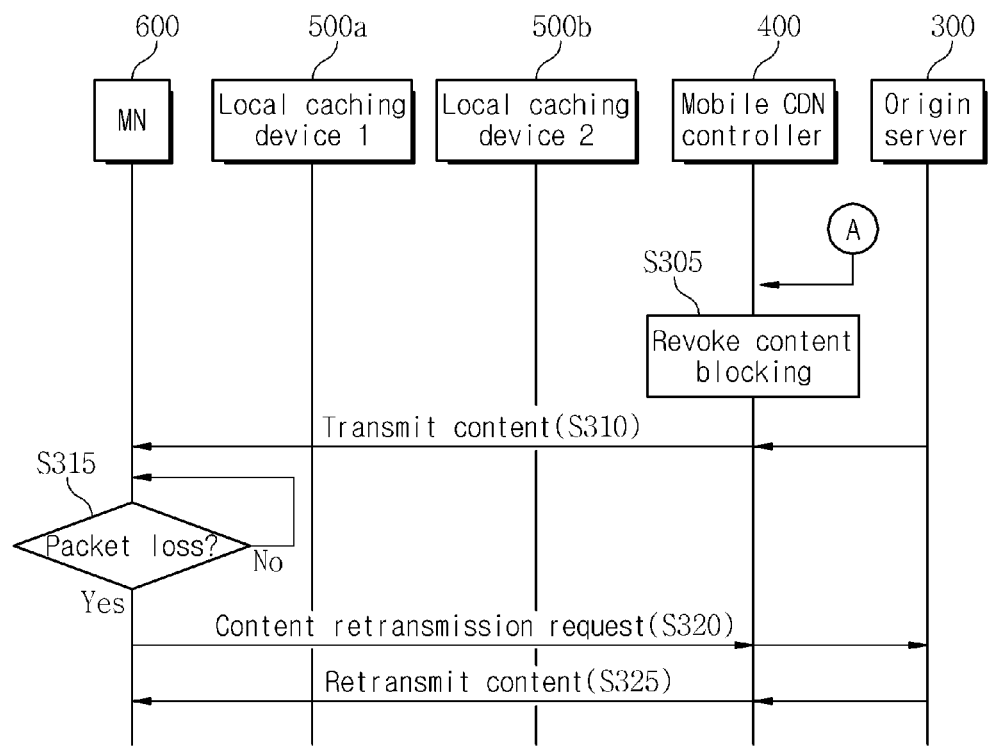
FIG. 9 is a flowchart illustrating a process of providing content during a hand-over according to a second embodiment in the mobile content providing method according to the present invention.
Figure 10:
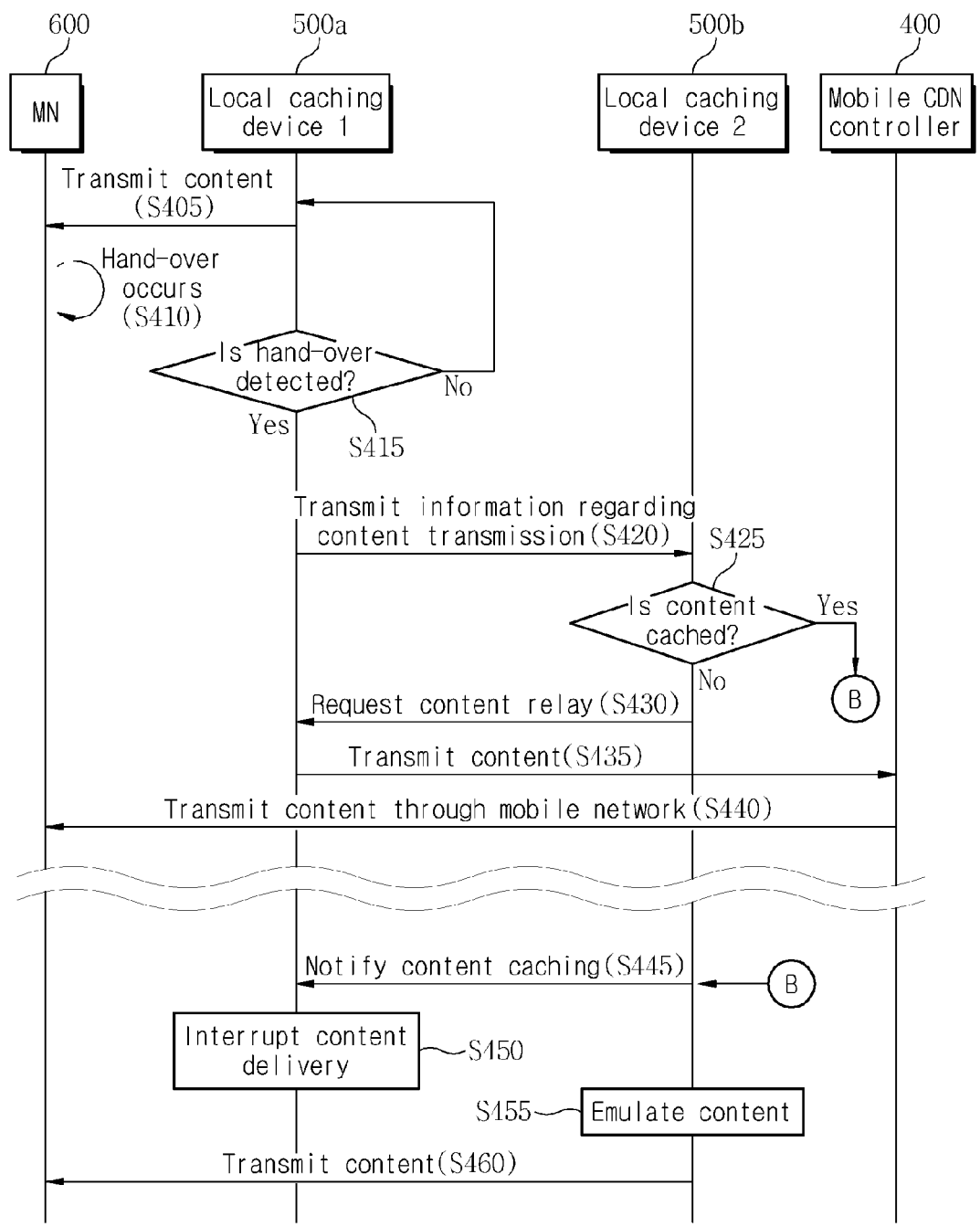
FIG. 10 is a flowchart illustrating a process of providing content during a hand-over according to a third embodiment in the mobile content providing method according to the present invention.

FIG. 9 is a flowchart illustrating a content transmission process in the mobile content providing method during a hand-over according to the second embodiment of the present invention when the mobile CDN controller 400 operates in the byte caching mode.

Referring to FIG. 9, in the second embodiment of the present invention, the mobile CDN controller 400 revokes blocking of the content (S305) when the local caching device 500*b* does not store the content in step S240 of FIG. 8.

That is, the mobile CDN controller 400 revokes blocking of content data transmitted from the origin server 300 during transmission of the content from the local caching device 500*a* to the mobile node 600 such that the content data is delivered to the mobile network 100, specifically, the packet core 111 of the core network 110. Here, the content data transmitted from the origin server 300 is in the form of an IP packet destined for the mobile node 600.

Accordingly, the content data transmitted to the mobile network 100 through the mobile CDN controller 400 is converted into a mobile packet destined for the mobile node 600 according to processing in the mobile network 100, specifically, processing by the packet core 111, and then delivered to the handed-over mobile node 600 through the wireless access network 130 (S310).

More specifically, upon reception of the content from the mobile CDN controller 400, the packet core 111 confirms the location of the mobile node 600 corresponding to the destination of the content. Here, since the mobile node 600 has been handed over to the wireless access network 130, the packet core 111 converts the content into a mobile packet destined for the BS (e.g. eNodeB) of the wireless access network 130 and transmits the mobile packet to the wireless access network 130. Upon reception of the mobile packet, the BS of the wireless access network 130 restores the IP packet from the mobile packet and transmits the IP packet to the mobile node 600.

The mobile node 600 may not receive some data of the content during the hand-over (S315).

In this case, the mobile node 600 requests retransmission of the content data that has not been received according to TCP procedure. This content retransmission request is transmitted to the origin server 300 (S320). The origin server 300 transmits the requested content data to the mobile node 600 (S325).

Accordingly, the mobile node 600 can seamlessly receive the whole content during the hand-over.

In the third embodiment of the present invention, content transmission may be processed as illustrated in FIG. 10. In FIG. 10, steps S405 to S415 correspond to steps S205 to S215 of FIG. 8.

As described above, when the local caching device 500*a* detects a hand-over of the mobile node 600 while transmitting content to the mobile node 600, the local caching device 500*a* transmits content transmission related information including at least one of the content transmission state information and the TCP information to the other local caching device 500*b* (S420). Here, the other local caching device 500*b* is connected to the wireless access network 130 to which the mobile node 600 has been handed over. The local caching device 500*a* can determine the local caching device 500*b* connected to the wireless access network 130 to which the mobile node 600 has been handed over with reference to position information of neighboring local caching devices. While the local caching device 500*a* directly transmits the information to the other local caching device 500*b*, the local caching device 500*a* may transmit the information to the other local caching device 500*b* through the mobile CDN controller 400. Here, the local caching device 500*a* may inform the mobile CDN controller 400 of the hand-over of the mobile node 600 simultaneously with transmission of the information.

The other local caching device 500*b* checks whether the content is stored therein (S425). When the content is not stored in the local caching device 500*b*, the local caching device 500*b* requests the local caching device 500*b* to relay the content (S430). As described above, steps S425 and S430 may be performed through the mobile CDN controller 400. That is, the mobile CDN controller 400 can determine the other local caching device 500*b*, check whether the local caching device 500*b* stores the content and, when the local caching device 500*b* does not store the content, request the local caching device 500*a* to relay the content.

Then, the local caching device 500*a* redirects delivery of content data transmitted to the wireless access network 120 to the mobile CDN controller 400 (S435). Here, the content data is a mobile packet or an IP packet destined for the mobile node 600 and may be transmitted to the mobile CDN controller 400 through a leased line, the Internet 200 or the mobile network 100.

Upon reception of the content data destined for the mobile node 600 from the local caching device 500*a*, the mobile CDN controller 400 transmits the received content data to the mobile network 100 (S440).

The content data transmitted from the local caching device 500*a* to the mobile CDN controller 400 is an IP packet destined for the mobile node 600, and the mobile CDN controller 400 transmits the IP packet destined for the mobile node 600 to the mobile network 100, specifically, the packet core 111 of the core network 110 such that the IP packet is sent to the wireless access network 130 to which the mobile node 600 has been handed over through the packet core 111 that controls mobility (hand-over) and packet flow in the mobile network 100 and delivered to the mobile node 600 through the wireless access network 130.

Accordingly, the local caching device 500*a* can seamlessly transmit content to the mobile node 600 that has been handed over to the wireless access network 130.

When the local caching device 500b stores the content in step 5425, the local caching device 500b informs the local caching device 500a that the content is stored in the local caching device 500b (S445), converts the stored content into a mobile packet destined for the mobile node 600 with reference to the received content transmission state information and TCP information (S455) and transmits the mobile packet to the mobile node 600 through the wireless access network 130 (S460). Here, the local caching device 500a may interrupt transmission of content to the mobile node 600 at an arbitrary time (S450). Steps S445 to S460 may be performed in the same manner as the first embodiment described with reference to FIG. 8.

The present invention is applicable to a mobile network. When a hand-over of a mobile node connected to a wireless access network occurs while content is provided to the mobile node through local caching devices distributed in the mobile network, a mobile CDN controller confirms a local caching device corresponding to a wireless access network to which the mobile node has been handed over and content is provided to the mobile node through the confirmed local caching device, achieving seamless content provision.

Particularly, when a hand-over is generated during transmission of content to the mobile node through a specific local caching device, blocking of content flow from a origin server according to the mobile CDN controller is revoked to deliver content transmitted from the origin server to the handed-over mobile node, or content delivered by the local caching device is redirected such that the content is transmitted to the handed-over mobile node through the mobile CDN controller, achieving seamless transmission of content even during a hand-over.

The method of providing mobile content during a hand-over according to the embodiments of the present invention may be implemented as program commands that can be executed by various computer means and written to a computer-readable recording medium. The computer-readable recording medium may include a program command, a data file, a data structure, etc. alone or in combination. The program commands written to the medium are designed or configured especially for the present invention, or known to those skilled in computer software. Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program command, such as a ROM, a RAM, and a flash memory. Examples of a program command include a premium language code executable by a computer using an interpreter as well as a machine language code made by a compiler. The hardware device may be configured to operate as one or more software modules to implement the present invention or vice versa.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims.

What is claimed is:

1. A mobile CDN controller, comprising:
a communication interface for communicating with a plurality of local caching devices distributed in a mobile network and a packet core of the mobile network; and
a content transmission controller for receiving, from a specific local caching device from among the plurality of local caching devices, a signal representing a hand-over of a mobile node to which the specific local caching device currently transmits content data, determining a selected one of local caching devices capable of transmitting the content data to the mobile node, and controlling the content data stored in one of the specific local caching device, the selected local caching device and a origin server to be transmitted to the mobile node according to whether the selected local caching device stores the content data.

2. The mobile CDN controller of claim 1, wherein the content transmission controller provides flow information necessary to transmit the content data to the mobile node to the selected local caching device such that the selected local caching device transmits the content data to the mobile node with reference to the flow information when the selected local caching device stores the content data.

3. The mobile CDN controller of claim 2, wherein the flow information includes at least one of content transmission state information and TCP information.

4. The mobile CDN controller of claim 1, wherein the content transmission controller receives the content data from the specific local caching device and transmits the content data to the packet core of the mobile network such that the content data is delivered to the mobile node when the selected local caching device does not store the content data.

5. The mobile CDN controller of claim 1, wherein the content transmission controller revokes blocking of content received from the origin server such that content data of the origin server is delivered to the mobile node through the packet core of the mobile network when the selected local caching device does not store the content data.

6. The mobile CDN controller of claim 1, wherein, when a hand-over of the mobile node is detected, the content transmission controller transmits a chunk data label corresponding to the content data, previously transmitted to the specific local caching device, to the selected local caching device such that the selected local caching device transmits the content data stored therein to the mobile node according to the chunk data label.

7. The mobile CDN controller of claim 1, wherein the communication interface communicates with the plurality of local caching devices through one of the mobile network, the Internet and a leased line.

8. A local caching device, comprising:
a storage unit configured to store content data;
an interface configured to communicate with (i) a plurality of local caching devices distributed in a mobile network and (ii) a mobile content delivery network (CDN) controller; and
a controller configured to
detect a hand-over of a mobile node during transmission of the stored content data to the mobile node,
inform the mobile CDN controller of the hand-over of the mobile node,
determine a selected one of local caching devices capable of providing content to the mobile node;
check whether the selected local caching device stores the content; and
transmit flow information including at least one of content transmission state information and TCP information to the selected local caching device directly or through the mobile CDN controller such that the selected local caching device transmits the content data when the selected local caching device stores the content data.

9. The local caching device of claim 8, wherein after hand-over notification the controller is configured to redirect transmission of the content data to the mobile CDN controller such that the content data is delivered to the mobile node through the mobile CDN controller.

10. A method of providing mobile content during a hand-over at a mobile CDN controller, the method comprising:
receiving a signal representing a hand-over of a mobile node from a specific local caching device currently transmitting content data to the mobile node;
determining a selected one of local caching devices capable of transmitting the content data to the mobile node from among local caching devices distributed in a mobile network;
checking whether the selected local caching device stores the content data; and
controlling the content data stored in one of the specific local caching device, the selected local caching device and a origin server to be transmitted to the mobile node according to whether the selected local caching device stores the content data.

11. The method of claim 10, wherein the controlling of the content data to be transmitted to the mobile node comprises transmitting flow information necessary to transmit the content data to the mobile node to the selected local caching device when the other local caching device stores the content data.

12. The method of claim 10, further comprising setting a content blocking state such that the content data received from the origin server is not transmitted to the mobile network when the content data is transmitted to the mobile node from the specific local caching device.

13. The method of claim 12, wherein the controlling of the content data to be transmitted to the mobile node comprises revoking the content blocking state such that the content data transmitted from the origin server is delivered to the mobile node through the mobile network when the other local caching device does not store the content data.

14. The method of claim 10, wherein the controlling of the content data to be transmitted to the mobile node comprises receiving the content data from the specific local caching device and delivering the content data to the mobile node through the mobile network when the selected local caching device does not store the content data.

15. A method of providing mobile content during a hand-over at a mobile CDN controller, the method comprising:
setting a content blocking state such that content data received from a origin server is not delivered to a mobile network while content data is transmitted to a mobile node from a specific local caching device distributed in the mobile network;
receiving a signal representing a hand-over of the mobile node from the specific local caching device; and
revoking the content blocking state such that the content data received from the origin server is delivered to the mobile node through the mobile network upon reception of the signal representing the hand-over of the mobile node.

16. A method of providing mobile content during a hand-over at a mobile content delivery network (CDN) controller, the method comprising:
receiving a signal representing a hand-over of a mobile node from a local caching device currently transmitting content data to the mobile node;
receiving content data destined for the mobile node from the local caching device; and
delivering the received content data to a packet core of a mobile network such that the received content data is delivered to the mobile node through a wireless access network to which the mobile node has been handed over.

17. A method of providing mobile content during a hand-over at a local caching device, the method comprising:
detecting a hand-over of a mobile node during transmission of content data to the mobile node;
informing a mobile CDN controller of the hand-over of the mobile node;
determining a selected one of local caching devices capable of providing content to the mobile node;
checking whether the selected local caching device stores the content; and
transmitting flow information including at least one of content transmission state information and TCP information to the selected local caching device directly or through the mobile CDN controller such that the selected local caching device transmits the content data when the selected local caching device stores the content data.

18. The method of claim 17, further comprising transmitting the content data to the mobile CDN controller such that the content data is transmitted to the mobile node according to relay of the mobile CDN controller when the 5 selected local caching device does not store the content data.

* * * * *